United States Patent
Winner et al.

(10) Patent No.: US 6,704,631 B2
(45) Date of Patent: Mar. 9, 2004

(54) METHOD AND DEVICE FOR DETERMINING A CORRECTED OFFSET VALUE

(75) Inventors: Hermann Winner, Bietigheim (DE); Werner Urban, Vaihingen/Enz (DE); Jens Lueder, Kornwestheim (DE); Frieder Keller, Ubstadt-Weiher (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/146,781

(22) Filed: May 16, 2002

(65) Prior Publication Data

US 2003/0040856 A1 Feb. 27, 2003

(30) Foreign Application Priority Data

May 16, 2001 (DE) .......................... 101 23 846
Feb. 9, 2002 (DE) .......................... 102 05 396

(51) Int. Cl.[7] .................. G01C 23/00; B60K 31/00
(52) U.S. Cl. ................ 701/34; 701/36; 701/93; 701/96; 180/170; 180/179
(58) Field of Search ................ 701/34, 36, 93, 701/96; 180/170, 179

(56) References Cited

U.S. PATENT DOCUMENTS

| | | | |
|---|---|---|---|
| 5,719,790 A | | 2/1998 | Lohrenz et al. |
| 5,809,444 A | * | 9/1998 | Hadeler et al. ............... 701/72 |
| 5,832,402 A | * | 11/1998 | Brachert et al. ............. 701/72 |
| 5,987,364 A | * | 11/1999 | Le Gusquet et al. .......... 701/24 |
| 6,122,577 A | * | 9/2000 | Mergenthaler et al. ....... 701/34 |
| 6,223,107 B1 | * | 4/2001 | Mergenthaler et al. ....... 701/34 |

FOREIGN PATENT DOCUMENTS

| | | | |
|---|---|---|---|
| DE | 195 02 858 | 7/1996 | |
| DE | 197 36 199 | 2/1998 | |
| DE | 196 36 443 | 3/1998 | |
| DE | 197 22 947 | 2/1999 | |
| EP | 690 289 | 3/1999 | |
| JP | 02281149 A | * 11/1990 | ............ G01P/15/00 |
| WO | WO 9901718 A1 | * 1/1999 | ............ G01D/3/08 |

\* cited by examiner

*Primary Examiner*—Michael J. Zanelli
*Assistant Examiner*—Eric M Gibson
(74) *Attorney, Agent, or Firm*—Kenyon & Kenyon

(57) ABSTRACT

A device is for determining a corrected offset value which represents the offset of the output signal of a first vehicle sensor, the sensor determining at least one motion of a vehicle. In this device, a first arrangement is provided by which at least two offset values representing the offset of the sensor are determined by at least two different methods. In addition, for at least one of the offset values of the sensor thus determined, an error band is determined in addition to the offset value. The corrected offset value is determined as a function of the offset values determined and at least one of the error bands.

15 Claims, 7 Drawing Sheets

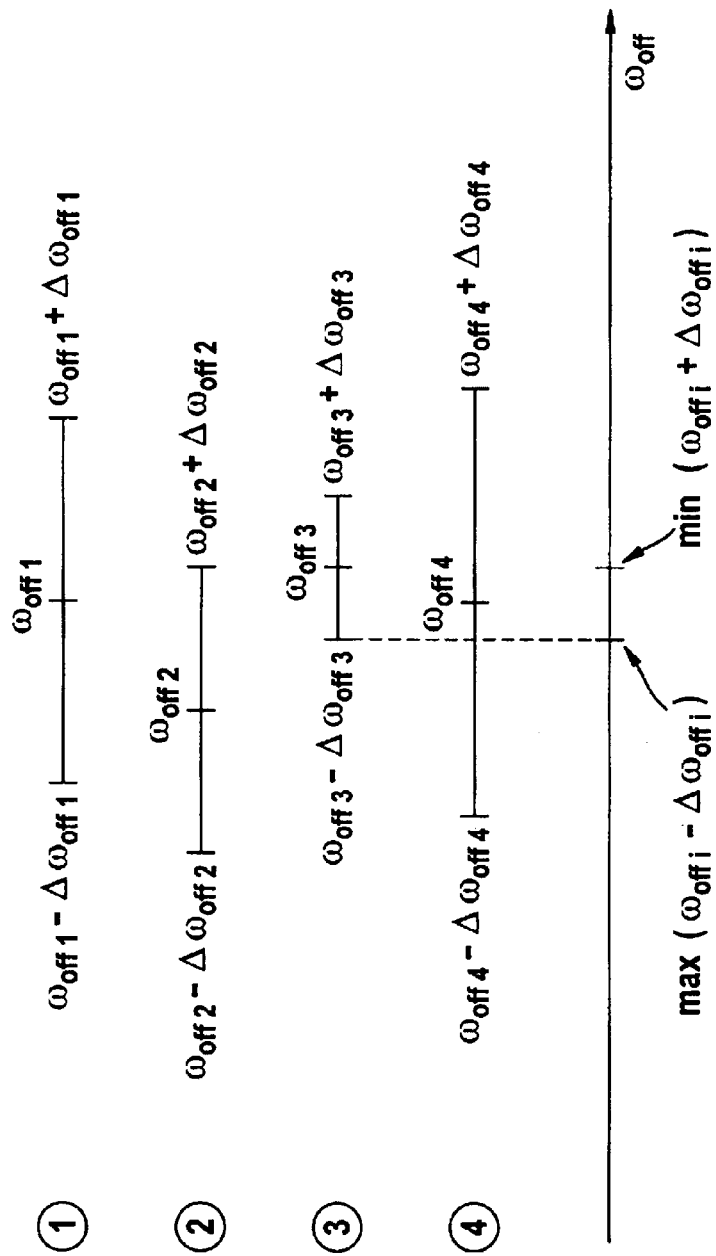

METHOD AND DEVICE FOR DETERMINING A CORRECTED OFFSET VALUE

FIELD OF THE INVENTION

The present invention relates to a device and a method for determining a corrected offset value.

BACKGROUND INFORMATION

Adaptive cruise control (ACC) for a vehicle regulates the distance maintained from the vehicle in front as a function of vehicle speed. A method is described in German Published Patent Application No. 197 22 947 from this field, whereby, among other things, the future course of a vehicle including an ACC system is taken into account in the ACC regulation. To do so, the future course range of at least one vehicle driving in front is determined, and then a lateral transverse offset is determined in relation to all vehicles detected. In steady-state road surface curvature conditions, i.e., when traveling along a straight route or in an area of constant curvature in a turn, the future driving corridor is easily determined using the conventional method with the help of a yaw rate signal or a rotational rate signal.

German Published Patent Application No. 196 36 443 describes a system for monitoring sensors in a vehicle. This system includes an arrangement with which identically defined comparison quantities for the sensors are determined for at least two sensors, starting from at least the signals generated by them. Furthermore, the system includes an additional arrangement with which a reference quantity is determined as a function of the comparison quantities at least thus determined. Starting from at least the reference quantity thus determined, monitoring is performed in a monitoring arrangement for at least one sensor. In addition to the monitoring arrangement, the system also contains an arrangement with which the signal generated by it is corrected for at least one sensor, at least as a function of the reference quantity.

SUMMARY

The present invention relates to a device for determining a corrected offset value which represents the offset of the output signal of a first vehicle sensor, the sensor detecting at least one motion of a vehicle.

The present invention includes a first arrangement by which at least two offset values representing the offset of the sensor are determined by at least two different methods. For at least one of the offset values of the sensor thus determined, an error band is also determined in addition to the offset value. A second arrangement is provided by which the corrected offset value is determined, as a function of the offset values thus determined and at least one of the error bands.

The present invention may provide that the offset values, which determine the output signals of the vehicle sensor, are determined more accurately with the device and the method according to the present invention through the second arrangement. This greater accuracy in determination of the offset values is accomplished by the fact that at least two offset values representing the offset of the sensor are determined by at least two different methods by the first arrangement. By including at least one error band, an even greater precision is achieved in determination of the corrected offset value.

An example embodiment of the present invention is characterized in that the error bands make it possible to state a minimum value and a maximum value for each offset value. Stating minimum and maximum values defines the range in which the offset value is located.

In addition, stating minimum and maximum values may permit the determination of the corrected offset value of the vehicle sensor by forming an average between the minimum of all maximum values and the maximum of all minimum values for the minimum and maximum values of the offset values of the vehicle sensor obtained by at least two different methods. This method of determining the corrected offset value is characterized in that it is especially simple to implement in the controller.

Another example embodiment is characterized in that the corrected offset value of the vehicle sensor is determined by forming a weighted average between the offset values of the vehicle sensor thus determined, the offset value having a lower weight in forming the average with an increase in the width of the error band. A wide error band means that the statement of the offset value is associated with a greater uncertainty. Therefore, "uncertain" offset values carry a lower weight in determining the corrected offset value than do "certain" offset values.

At least one error band may become wider, the longer it has been since the last determination of the respective offset value. The longer it has been since the determination of the offset value, the less up-to-date these values are, because during this period of time the driving condition or ambient conditions might have changed drastically. Therefore, the relevance of this offset value declines over a period of time. This is manifested in a wider error band.

An example embodiment is characterized in that each of the different methods of determining offset values has a validity range assigned to it which depends on the driving status, for those methods which are outside their validity range at the moment due to the prevailing driving status and which do not determine a quantity representing the offset value, the quantity representing the offset value determined most recently by this method within the last occurrence of this validity range is used, and the respective error band becomes wider, the longer it has been since this last valid determination of this quantity representing the offset value.

The vehicle sensor may detect the yawing motion of the vehicle. The present invention may be applied to the output signals of a rotational rate sensor, i.e., the vehicle sensor detects the yaw rate. In this case, the present invention may be used in a system for automatic distance regulation and/or control.

An example embodiment is characterized in that the offset values are determined as a function of output signals of additional sensors, which detect the motion of the vehicle, and/or of the vehicle sensor, it being provided that the output signals represent the wheel rotational speeds of at least one vehicle wheel and/or the steering wheel angle of the vehicle and/or the yaw rate of the vehicle.

The sensors required for this as well as their output signals may already be present as standard equipment in automotive regulation systems or driver assistance systems, e.g., in driving dynamics regulation systems (FDR) and in adaptive cruise control systems (ACC).

Another example embodiment is characterized in that the first arrangement is configured so that an offset value is determined by at least one method as a function of the operating state of the vehicle prevailing at the moment, it being provided that the operating state prevailing at the moment is determined by the longitudinal velocity of the vehicle and/or the yaw rate and/or the steering wheel angle.

This example embodiment may permit, e.g., for the case when the vehicle sensor detects the yaw rate, the determination of offset values of the rotational rate sensor for the case of almost negligible longitudinal velocity of the vehicle (standstill compensation method) or for the case when the longitudinal velocity is not almost negligible (steering angle method).

According to an example embodiment, the first arrangement is configured so that an offset value is determined by at least one method as a function of at least the analysis of one output signal of at least one of the additional sensors at at least two different points in time and/or as a function of at least the analysis of one output signal of the vehicle sensor at at least two different points in time, it being provided that at least one offset value is determined as a function of the time characteristic of the output signal of the vehicle sensor and/or as a-function of signals that represent the wheel rotational speeds of at least one vehicle wheel.

This analysis of output signals of sensors at different points in time may allow for, for example, the use of histogram methods or regression methods for the determination of an offset value of the vehicle sensor.

An example embodiment of the present invention is characterized in that the first arrangement is configured so that by a first method, a first offset value is determined by a standstill compensation method, characterized by a negligible longitudinal velocity of the vehicle, a negligible yaw rate and a negligible time derivation of the yaw rate, and by a second method, a second offset value is determined by a steering angle method, characterized by the longitudinal velocity of the vehicle and the steering wheel angle, and by a third method, a third offset value is determined by a histogram method, and by a fourth method, a fourth offset value is determined by a regression method, the yaw rate being calculated from differences in the wheel rotational speed.

There are thus different methods having different validity ranges.

In another example embodiment, the corrected offset value determined by the second arrangement is determined at regular or irregular time intervals.

In an example embodiment of the present invention, in the first arrangement the offset value is determined as a function of output signals of the vehicle sensor itself and/or output signals of additional sensors which detect the motion of the vehicle. It is provided here that the output signals represent the wheel rotational speeds of at least one vehicle wheel and/or the steering wheel angle of the vehicle and/or the yawing motion of the vehicle.

The required sensors as well as their output signals may already be present as standard equipment in automotive regulation systems or driver assistance systems, e.g., in driving dynamics regulation systems (FDR) and adaptive cruise control (ACC).

There are various possibilities for the example embodiment of the first arrangement provided for the determination of the offset values. In one example embodiment, an offset value is determined by at least one method as a function of the operating state of the vehicle prevailing at the moment. It is provided that the operating state prevailing at the moment is determined by the longitudinal velocity of the vehicle and/or the yaw rate and/or the steering wheel angle.

This example embodiment may permit, e.g. for the case when the vehicle sensor detects the yaw rate, the determination of offset values of the rotational rate sensor for the case of almost negligible longitudinal velocity of the vehicle (standstill compensation method) or for the case when the longitudinal velocity is not almost negligible (steering angle method).

Another example embodiment is characterized in that the first arrangement are configured so that an offset value is determined by at least one method as a function of at least the analysis of one output signal of the vehicle sensor at at least two different points in time and/or as a function of at least the analysis of one output signal of at least one of the additional sensors at at least two different points in time.

It is provided here that at least one offset value is determined as a function of the time characteristic of the output signal and/or as a function of signals which represent the wheel rotational speeds of at least one vehicle wheel. This analysis of output signals of sensors at different points in time may allow for, for example, the use of histogram methods or regression methods for the determination of an offset value of the vehicle sensor.

An example embodiment of the present invention may include, for example, the use of four methods, namely a standstill compensation method, a steering angle method, a histogram method and a regression method.

Thereby by a first method, a first offset value is determined by a standstill compensation method, characterized by a negligible longitudinal velocity of the vehicle, a negligible yaw rate and a negligible time derivation of the yaw rate, and by a second method, a second offset value is determined by a steering angle method, characterized by the longitudinal velocity of the vehicle and the steering wheel angle, and by a third method, a third offset value is determined by a histogram method, and by a fourth method, a fourth offset value is determined by a regression method, the yaw rate being calculated from differences in the wheel rotational speed.

In the example embodiment of the first arrangement, in addition to the offset value, an error band is also determined for the offset value of the vehicle sensor determined by at least two different methods, when there are at least two methods, this error band allowing a minimum value and a maximum value to be given for the respective offset value. The width of this error band may be a measure of the size of the estimated absolute error of the offset value. This may open up possibilities for the determination of the corrected offset value of the vehicle sensor because at least one of the at least two error bands may be included in the determination of the corrected offset value.

For example, the determination of the corrected offset value of the vehicle sensor may be performed in the second arrangement by forming an average between the minimum of all maximum values of the offset values obtained by at least two different methods and the maximum of all minimum values of the offset values obtained by at least two different methods.

For example, the determination of the corrected offset value of the vehicle sensor may be performed in the second arrangement by forming a weighted average between the offset values determined for the vehicle sensor, the offset value having a greater weight in forming the average with an increase in the estimated absolute error or with an increase in the width of the error band. This means that an offset value having a greater estimated absolute error or a greater width of the error band would have less weight in forming the average than an offset value having a smaller estimated error or a smaller width of the error band.

In addition, the corrected offset value determined by the second arrangement may be determined at regular or irregular time intervals.

An example embodiment of the present invention is illustrated in the following drawing and explained in greater detail in the following description.

BRIEF DESCRIPTION OF THE DRAWINGS

FIG. 7 illustrates in a qualitative representation the case when, in addition to the offset value, an error band is also determined by the various methods, illustrating how the corrected offset value is determined by forming an average between the minimum of all maximum values and the maximum of all minimum values.

DETAILED DESCRIPTION

The present invention will now be described on the basis of FIGS. 1 through 7. The form of the selected example embodiment—use of the device and the method according to the present invention in a system for automatic distance regulation in a vehicle—shall not restrict the scope of the present invention.

Figure 1:
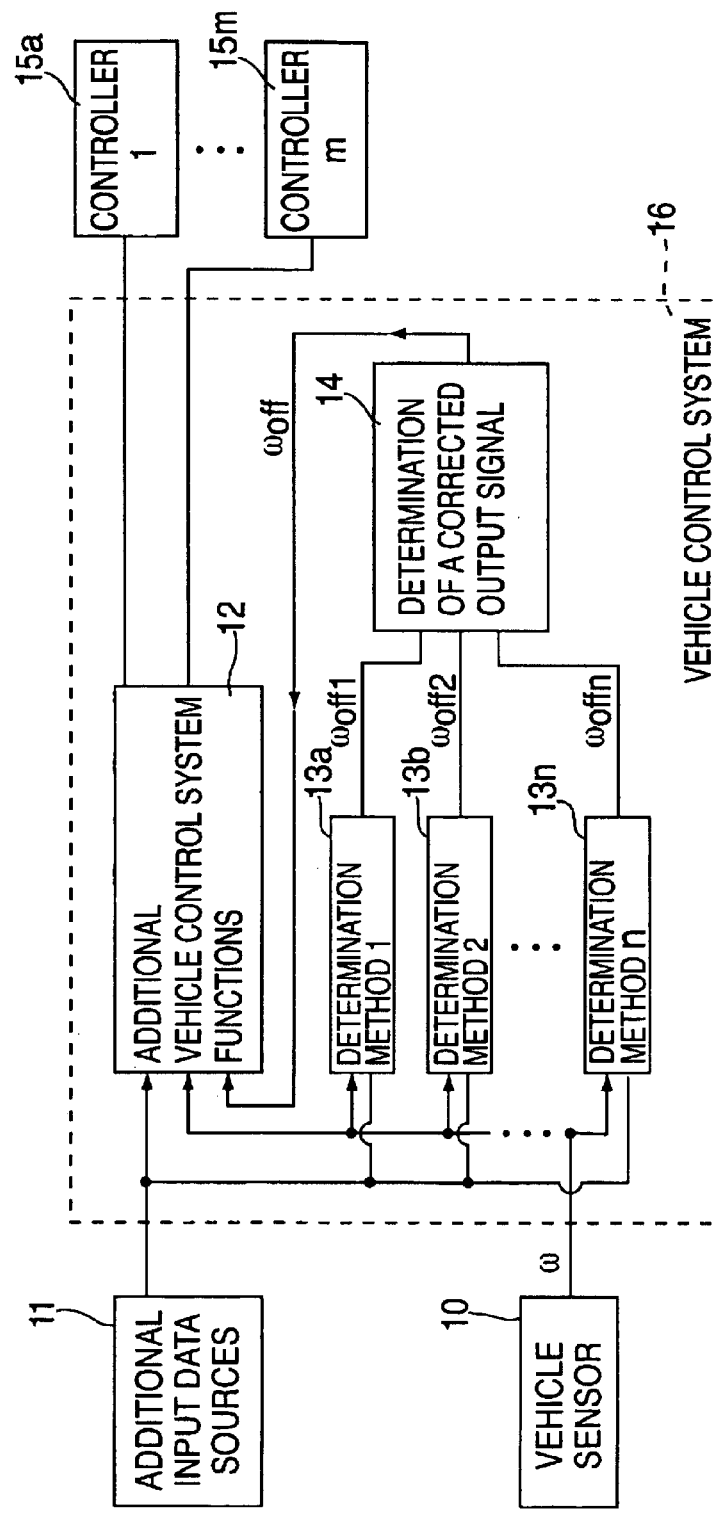
FIG. 1 schematically illustrates a vehicle control system and its input and output channels an illustrates the functions that are important for the present invention.

FIG. 1 is a schematic diagram of a vehicle control system 16 and the input and output channels according to the present invention. The output signals of a vehicle sensor 10 and other signals from other input data sources 11, not specified further, are available as input signals of vehicle control system 16 on the input channels.

The vehicle control system is composed of blocks $13a, \ldots, 13n$, which are used for determining offset values $\omega_{off1}, \ldots, \omega_{offn}$ which represent the offset of the output signal of vehicle sensor 10, block 14 in which a corrected offset value $\omega_{offkorr}$ is determined from offset values $\omega_{off1}, \ldots, \omega_{offn}$ determined in blocks $13a, \ldots, 13n$, and block 12, which includes all the other functions of vehicle control system 16.

The output signals of vehicle control system 16 go to m additional controllers $15a, \ldots, 15m$. These m additional controllers may include, for example, the engine controller, the ESP controller (ESP=electronic stability program) or the transmission control in an example embodiment. It is also possible for the output signals of vehicle control system 16 to be relayed to a driver information system.

Figure 2:
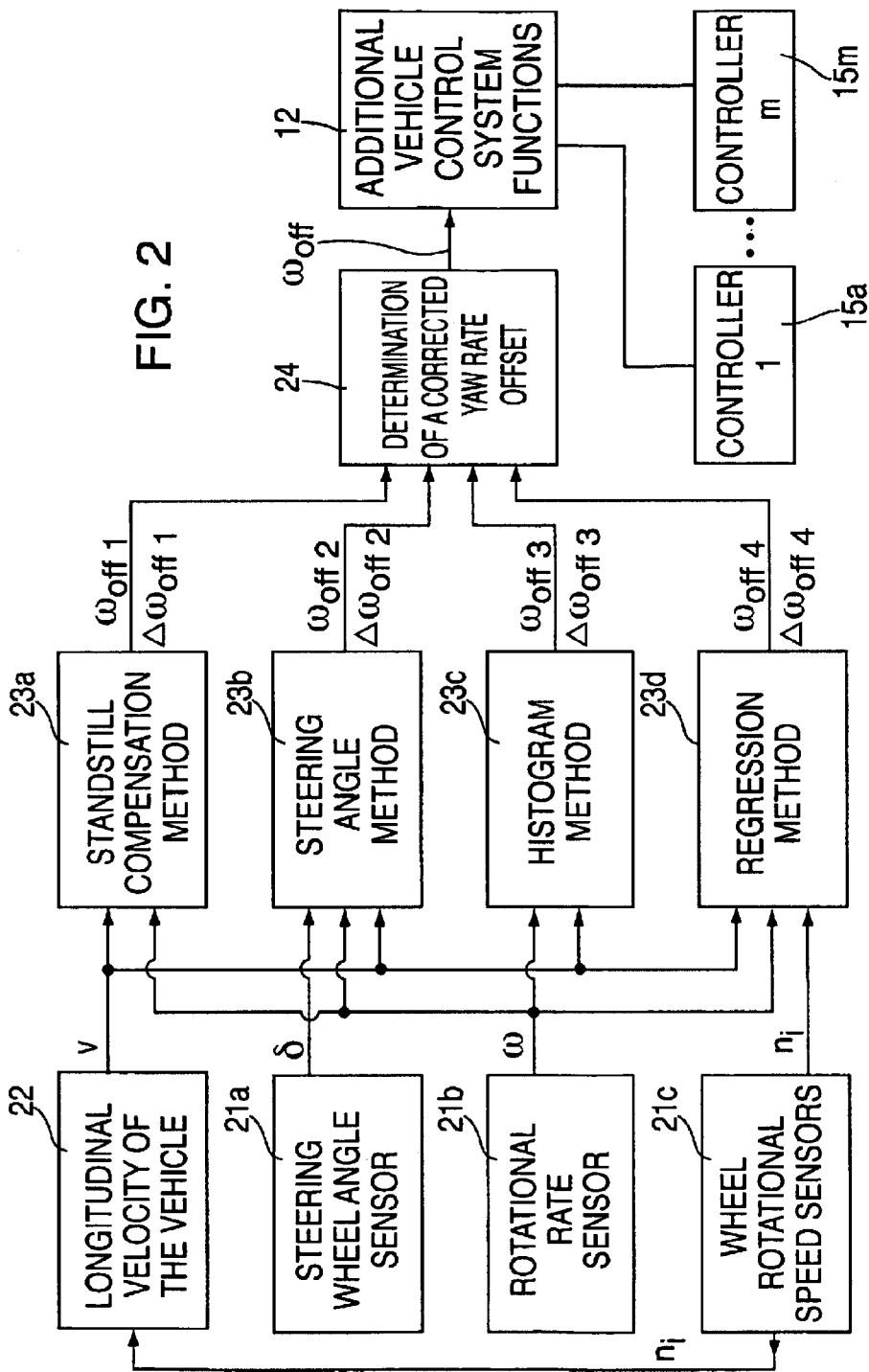
FIG. 2 illustrates an example embodiment of the present invention for the case when the vehicle sensor is a rotational rate sensor, the offset value of the output signal of the rotational rate sensor is determined as a function of the output signal of the rotational rate sensor itself and of the output signals of additional sensors which detect the steering wheel angle and the wheel rotational speeds, and the offset value of the output signal of the rotational rate sensor is determined by the following four methods: standstill compensation method, steering angle method, histogram method and regression method.

FIG. 2 illustrates an example embodiment of the present invention for the case of a system for adaptive cruise control (ACC). The sensors according to the present invention as well as the input and output channels have been illustrated.

In this example embodiment, vehicle sensor 10 is configured as a rotational rate sensor 21b. Additional input sources 11 are configured as steering wheel angle sensor 21a and as wheel rotational speed sensors 21c.

Rotational rate sensor 21b supplies an output signal $\omega$ which represents the yaw rate, steering wheel angle sensor 21a supplies an output signal $\delta$ which represents the steering wheel angle, and wheel rotational speed sensors 21c supply output signals $n_i$ which represent the wheel rotational speeds of the individual wheels.

These output signals $\omega$, $\delta$ and $n_i$ as well as signal v representing the longitudinal velocity of the vehicle enter into vehicle control system 16 as input signals. The longitudinal velocity of the vehicle is not generally detected directly by a sensor, but instead is determined from signals $n_i$ supplied by wheel rotational speed sensors 21c representing the wheel rotational speeds of the individual wheels. This determination may be performed, for example, in the controller of a driving dynamics regulation system (ESP).

The offset value of output signal $\omega$ of rotational rate sensor 21b is determined by the four following methods in vehicle control system 16: by a standstill compensation method 23a, by a steering angle method 23b, by a histogram method 23c and by a regression method 23d.

Standstill compensation method 23a requires as input signals signal v representing the longitudinal velocity of the vehicle as well as signal $\omega$ representing the yaw rate. Steering angle method 23b also requires signal $\delta$, representing the steering wheel angle, in addition to these two quantities. The input signal needed for the histogram method 23c is signal $\omega$ representing the yaw rate plus signal v representing the longitudinal velocity of the vehicle. Regression method 23d requires as input signals, signals $n_i$ representing the wheel rotational speeds, signal $\omega$ representing the yaw rate and signal v representing the longitudinal velocity of the vehicle.

As output signals, standstill compensation method 23a supplies a signal $\omega_{off1}$ which represents an approximate value for the yaw rate offset of rotational rate sensor 21b as well as an additional signal $\Delta\omega_{off1}$ which represents the half-width of the respective error band. Steering angle method 23b supplies a signal $\omega_{off2}$ which represents an approximate value for the yaw rate offset of rotational rate sensor 21b as well as an additional signal $\Delta\omega_{off2}$ which represents the half-width of the respective error band. Histogram method 23c supplies a signal $\omega_{off3}$ which represents the yaw rate offset of rotational rate sensor 21b as well as an additional signal $\Delta\omega_{off3}$ which represents the half-width of the respective error band. Regression method 23d supplies a signal $\omega_{off4}$ which represents the yaw rate offset of rotational rate sensor 21b as well as an additional signal $\Delta\omega_{off4}$ which represents the half-width of the respective error band.

So far, a distinction has been made between signals and the physical quantities represented by the signals. To simplify the discussion, this distinction will no longer be strictly retained in the following discussion. The quantities $\omega$, $\delta$, $n_i$, v, $\omega_{off1}$, $\omega_{off2}$, $\omega_{off3}$, $\omega_{off4}$, $\Delta\omega_{off1}$, $\Delta\omega_{off2}$, $\Delta\omega_{off3}$ and $\Delta\omega_{off4}$ shall no longer designate just the signals but instead shall also refer to the quantities represented by the signals.

Generally, for the sake of differentiation the word "signal" will be used preceding the respective quantity when referring to the signal and not the physical quantity.

The error band is a measure of the maximum absolute error to which the quantity representing the offset of the output signal of rotational rate sensor 21b is subject.

With the example of the standstill compensation method, this means that the true offset value of the yaw rate sensor is in all probability between the values $(\omega_{off1}-\Delta\omega_{off1})$ and $(\omega_{off1}+\Delta\omega_{off1})$. Thus, the term "half-width $\Delta\omega_{off1}$" also becomes clear. The same thing is also true of the error bands in the other three methods.

From these approximation values, $\omega_{off1}, \ldots, \omega_{off4}$ as well as the respective widths of the error bands, a corrected offset value $\omega_{offcorr}$, which is characterized by a greater accuracy in comparison with quantities $\omega_{off1}, \ldots, \omega_{off4}$, of the yaw rate sensor is calculated in arrangement 24, representing an example embodiment of arrangement 14.

It should be pointed out that the four methods used, namely the standstill compensation method, the steering angle method, the histogram method and the regression method each have a different validity range, depending on the driving status. This means that, depending on the driving status, perhaps not all four methods used will determine the quantities representing the offset value at the same time. In the methods which do not determine any quantities representing the offset value at the moment, the last valid quantity representing the offset value determined by this method is used. At the same time, the error band determined for this quantity is widened over time. This means that the respective error band becomes wider, the longer it has been since the last valid determination of this quantity representing the offset value. This reference back to the last offset value determined requires storage of at least the last offset value determined as well as the last error band width determined for each method.

Figure 3:
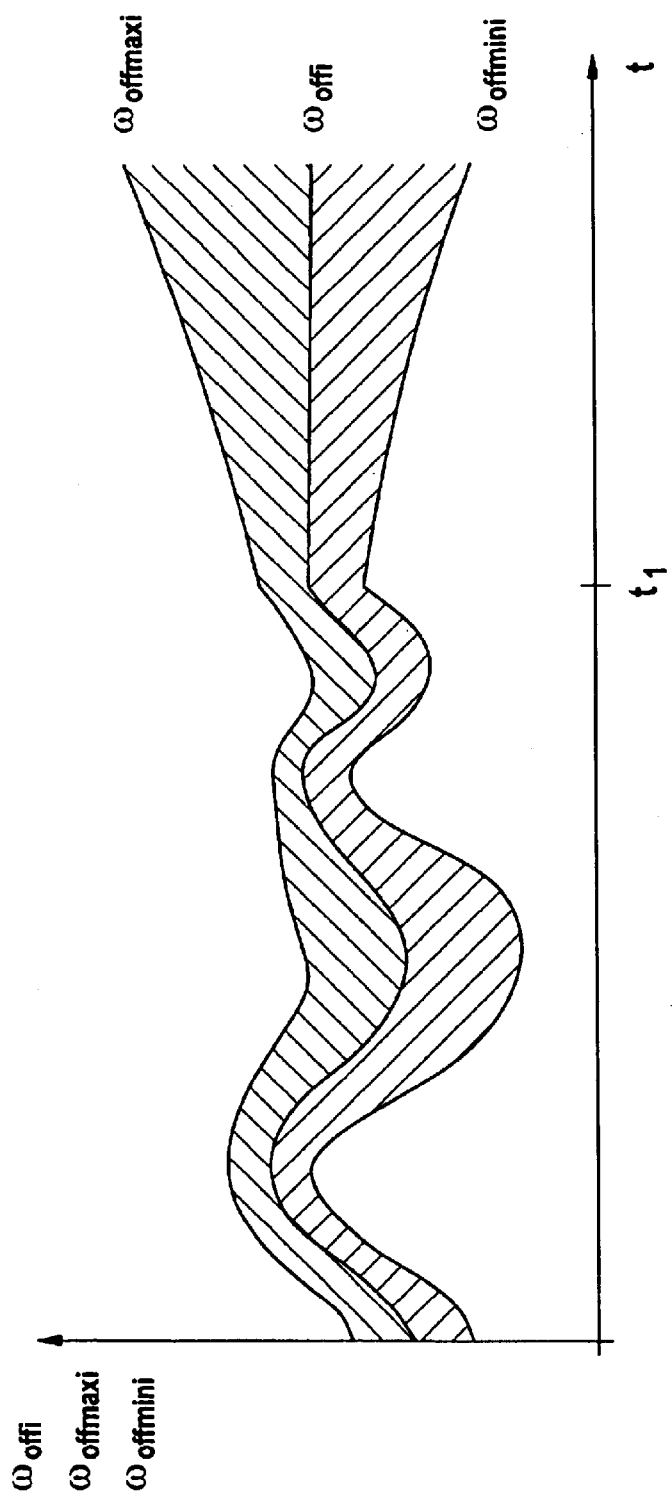
FIG. 3 illustrates the time characteristic of a yaw rate offset thus determined and the respective error band in a qualitative representation.

This widening of the error band is illustrated qualitatively in FIG. 3. In this x-y diagram, time t has been plotted on the abscissa, and quantities $\omega_{offi}$, $\omega_{offmini}$ and $\omega_{offmaxi}$ have been plotted on the ordinate, where $\omega_{offi}$ denotes the offset value of the yaw rate sensor determined by the i-th method; $\omega_{offmini}$ is the minimum value determined by the error band, i.e., $\omega_{offmini}=\omega_{offi}-\Delta\omega_{offi}$ and $\omega_{offmaxi}$ is the maximum value defined by the error band, i.e., $\omega_{offmaxi}=\omega_{offi}+\Delta\omega_{offi}$. It should also be pointed out that it is quite feasible for the determination of $\omega_{offmini}$ and $\omega_{offmaxi}$ from $\omega_{offi}$ to use different $\Delta\omega_{offi}$ values, i.e., $\omega_{offi}$ is no longer exactly in the middle between $\omega_{offmini}$ and $\omega_{offmaxi}$. This may be accomplished through the introduction of weighting factors, i.e., $\omega_{offmini}=\omega_{offi}-c_1\cdot\Delta\omega_{offi}$ and $\omega_{offmaxi}=\omega_{offi}+c_2\cdot\Delta\omega_{offi}$, where $c_1$ and $c_2$ are different weighting factors which may be constant but may also depend on parameters such as time.

The validity range for the i-th method extends from time t=0 to time $t=t_1$. For times $t>t_1$, it shall be assumed that the validity prerequisites are no longer met. Therefore, for $t>t_1$ no additional offset values are determined and instead the offset value determined for time $t_1$ is used. The error band defined by values $\omega_{offmini}$ and $\omega_{offmaxi}$ is then widened continuously for $t>t_1$.

Corrected offset value $\omega_{offcorr}$ thus determined is sent to another block 12 where additional functions of the vehicle control system are implemented. Block 12 also has quantity $\omega_{offcorr}$ as an input signal in addition to other quantities.

Details of blocks 23a, 23b, 23c and 23d are described below; these blocks supply quantities $\omega_{off1}, \ldots, \omega_{off4}$ which represent the offset of the output signal of rotational rate sensor 21b.

Standstill compensation method 23a supplies quantities $\omega_{offi}$ which represent the offset of the output signal of rotational rate sensor 21b, independently of the instantaneous motion status of the vehicle, i.e., also in the case of a vehicle which is not standing still.

The standstill case is ascertained when the following three conditions a), b) and c) are met simultaneously:
a) The longitudinal velocity of the vehicle is less than a first predetermined maximum value, which is designated as limit velocity $v_G$.
b) Yaw rate ω is less than a second predetermined maximum value.
c) The yaw acceleration, which is the time derivation of the yaw rate, is less than a third predetermined maximum value.

In the case of a very low longitudinal velocity v of the vehicle, very low wheel rotational speeds $n_i$ which then prevail are no longer detected by the wheel rotational speed sensors and are incorrectly recognized as being zero. Therefore, in a device in the vehicle for determining the longitudinal velocity of the vehicle, this is incorrectly determined as being negligible. Limit velocity $v_G$ is the longitudinal velocity of the vehicle which is still detected as being not negligible. For each longitudinal velocity below limit velocity $v_G$, the longitudinal velocity is incorrectly determined to be zero.

Points b) and c) ensure that a vehicle which has a negligible longitudinal velocity and is standing on a rotating plate will not be detected as standing still.

For the standstill compensation, output signal ω of rotational rate sensor 21b is input into block 23a at regular discrete sampling times t, at constant time intervals $t_a$. At the same time, a check is performed at these sampling times $t_i$ to ascertain whether conditions a), b) and c) which define a standstill are met. In addition, a time interval $T_n=n\cdot\Delta t_a$ is defined, wherein n is an integer greater than 2. If conditions a), b) and c) which define a standstill are met during a time interval $T_n$ at all sampling times $t_i$ falling within this interval, then a standstill is regarded as confirmed. Such a time interval $T_n$ during which conditions a), b) and c) which define a standstill are all met simultaneously at each sampling time falling within this interval is referred to below as the fulfillment interval.

Figure 4:
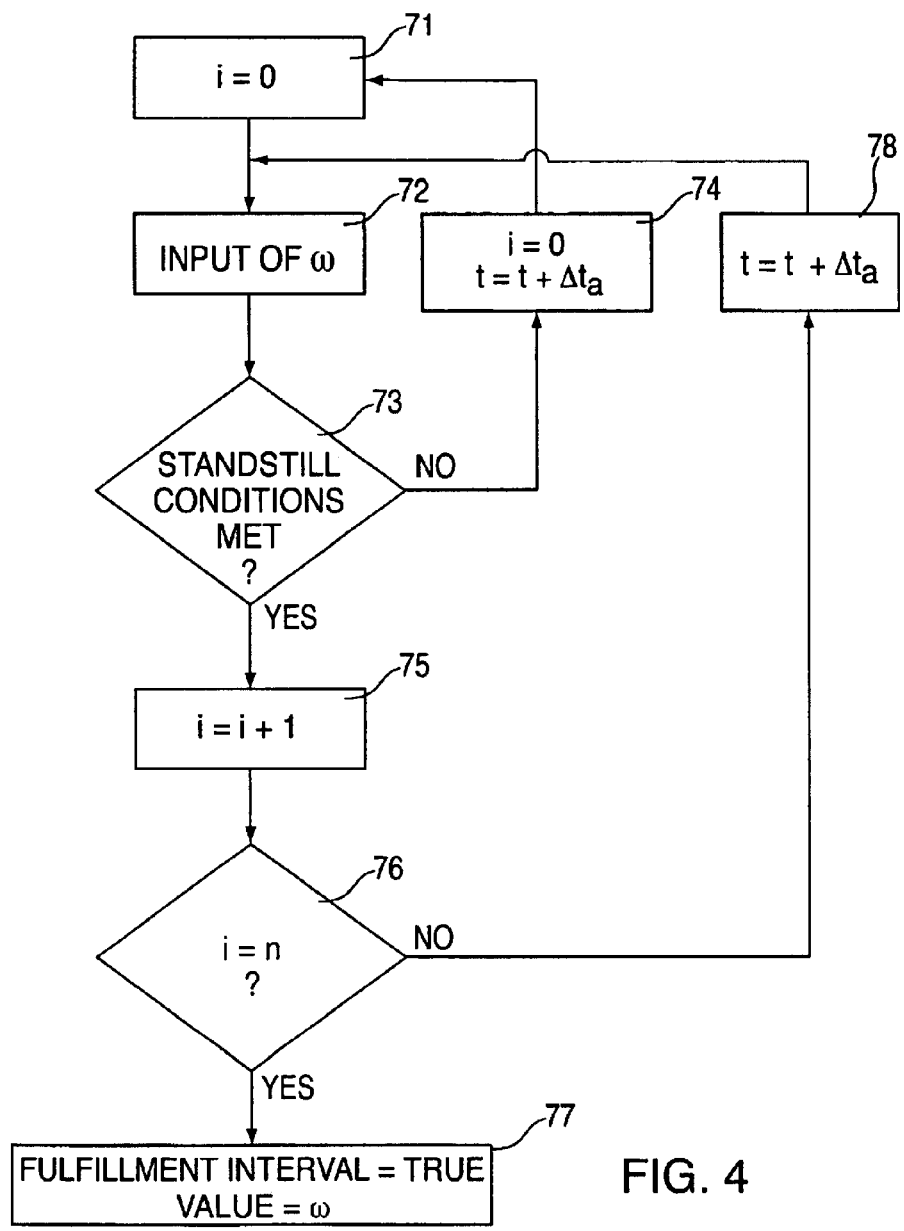
FIG. 4 illustrates in the form of a flow chart the determination of a fulfillment interval, which may be needed for the calculation of the yaw rate offset value by the standstill compensation method.

The process sequence for detection of a fulfillment interval is illustrated in FIG. 4. In block 71, integral variable i=0 is set. Then in block 72, output signal ω of the yaw rate sensor is input. In block 73, a check is performed to determine whether all three standstill conditions a), b) and c) are met at the same time. If this is the case, then in block 75 number i is incremented by 1. If this is not the case, then in block 74 i=0 is set and at the same time the sequence begins with block 71 again at a time which is later by time interval $t_a$. Variable i indicates the number of uninterrupted fulfillments of all three conditions a), b) and c) which define a standstill. In block 76 a check is performed to determine whether this number i of uninterrupted fulfillments has reached value n. If this is the case, then in block 77 detection of a fulfillment interval is documented by "fulfillment interval=true." At the same time, most current value ω of the output signal of the yaw rate sensor is allocated to the variable "value." In this example embodiment, it is a filtered value. If number i in block 76 has not yet reached value n, then at a point in time which is later by interval $t_a$ (block 78) the output signal of yaw rate sensor ω is input again in block 72.

As soon as a fulfillment interval has been detected, the length of the following time interval may be shortened.

Instead of time interval $T_n$, a shorter time interval $T_m$ replaces it now, this interval having the length of time interval $T_m = m \cdot \Delta t_a$, where m is an integer smaller than n. Only when the case of non-standstill has been detected again does it return to longer time interval $T_n = n \cdot \Delta t_a$ and retain this length of the time interval again until a fulfillment interval has been detected again.

For the determination of offset value $\omega_{off1}$ in block 23a, signal $\omega$ sampled last of the next-to-last fulfillment interval is used. The only exception here is the first fulfillment interval which is also characterized by a greater length $T_a = n \cdot \Delta t_a$. Since there is no directly preceding fulfillment interval here, signal $\omega$ sampled last is used here in this fulfillment interval for the determination of offset value $\omega_{off1}$ in block 23a. Instead of the signal sampled last, a filtered or averaged signal or a signal that has been both filtered and averaged may also be used.

To illustrate the functioning of the standstill compensation in block 23a, the following linear vehicle motion having a negligible yaw rate and negligible yaw acceleration shall be considered.

Phase 1: The vehicle travels at a constant longitudinal velocity.

Phase 2: The vehicle begins to brake. The longitudinal velocity of the vehicle is still greater than limit velocity $v_G$ defined in a).

Phase 3: The braking operation ceases. The longitudinal velocity of the vehicle is already lower than limit velocity $v_G$.

Phase 4: The vehicle is exactly at a standstill.

Phase 5: The vehicle begins to accelerate. The longitudinal velocity of the vehicle is still lower than limit velocity $v_G$.

Phase 6: The acceleration process is advanced. The longitudinal velocity of the vehicle is greater than limit velocity $v_G$.

In phase 1 and phase 2, condition a) is not met. The vehicle is not at a standstill.

In phase 3, all three conditions are met, so the case of a standstill is assumed, although the vehicle was still rolling. Therefore, time interval $T_n$ was introduced to avoid reprocessing first signals $\omega$ determined there as signals representing a standstill of the vehicle.

The length of time interval $T_n$ is defined by the required inclusion of rolling in braking operations below limit velocity $v_G$ as defined in a) as well as the required inclusion of filtering times of signal $\omega$ in block 23a. Ideally, the length of time interval $T_n$ is greater than an assumed realistic duration of phase 3 as well as the filtering times. In phase 4, all three conditions a), b) and c) are met at all sampling times $t_i$.

Therefore, now the output signal of rotational rate sensor 21b is input in block 23a over shorter time intervals $T_m$, and yaw rate offset $\omega_{off1}$ is determined from this and from the next to last fulfillment interval.

In phase 5, all three conditions a), b) and c) are again met at all sampling times, although the vehicle is no longer at a standstill. Yaw rate offset $\omega_{off1}$, however, is determined from the next-to-last fulfillment interval, which still ideally falls in phase 4 in which there was still an actual vehicle standstill.

In phase 6, the three conditions a), b) and c) are no longer met at the same time, which is why the vehicle is no longer assumed to be at a standstill and no other offset values $\omega_{off1}$ are determined. Since the vehicle is now in motion, no additional offset values $\omega_{off1}$ may be determined until a new vehicle standstill, as characterized by the fulfillment of all three conditions a), b) and c), occurs.

The standstill compensation method also functions in a vehicle which is detected as not being at a standstill. In the case of a vehicle detected as not being at a standstill, valid offset value $\omega_{off1}$ determined last is read out of a memory and used again.

However, the error band having half-width $\Delta\omega_{off1}$ then becomes wider over time. This means that a wider error band is assumed, the greater the amount of time elapsed since the last valid determination of offset value $\omega_{off1}$.

In contrast with the standstill compensation method, the steering angle method works only when the vehicle is not at a standstill. The basis for the calculation of the yaw rate offset in the steering angle method is the equation $$\omega_{LWS} = \frac{1}{i_L \cdot l} \cdot \frac{v}{1 + \frac{v^2}{v_{ch}^2}} \cdot \delta, \tag{1}$$

which is described in the technical literature (see, for example, Bosch Power Engineering Pocketbook, 23$^{rd}$ edition, page 707). In addition to longitudinal velocity v of the vehicle and steering wheel angle $\delta$, steering ratio $i_L$, a characteristic vehicle velocity $v_{ch}$ and wheel base l also enter into this equation. The steering ratio refers to the mechanical ratio between steering angle $\delta$ and the steering angle of the front wheels.

Offset $\omega_{off2}$ is obtained as the difference between yaw rate $\omega_{LWS}$ calculated from the above equation (1) and yaw rate $\omega$ measured by the yaw rate sensor.

In addition to the calculation of an offset value $\omega_{off2}$, equation (1) also allows the calculation of the width of an error band by the error propagation law.

Figure 5:
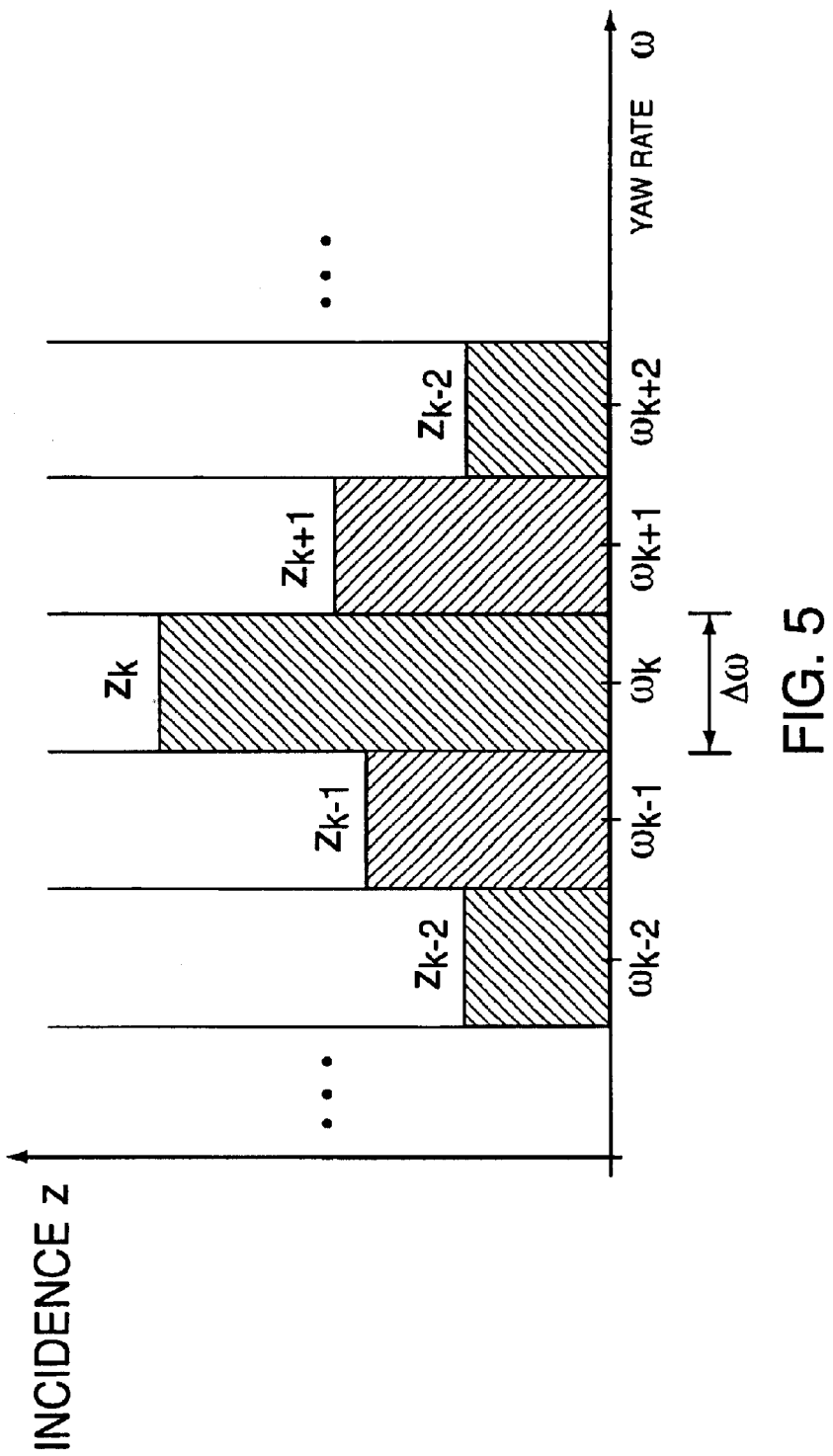
FIG. 5 illustrates in a qualitative representation a histogram such as that used as the basis for the determination of the offset value by the histogram method.

The histogram method illustrated in FIG. 5 is based on a statistical analysis of yaw rate signals $\omega$ supplied by rotational rate sensor 21b. Only discrete yaw rate values $\omega_{k-1}$, $\omega_k$, $\omega_{k+1}$, . . . having constant discrete intervals $\Delta\omega$ shall be considered. It thus holds that $\omega_{k-1} = \omega_k - \Delta\omega$ and $\omega_{k+1} = \omega_k + \Delta\omega$. An interval of width $\Delta\omega$, at the center of which the discrete yaw rate value is located, is assigned to each of these discrete yaw rate values. The interval having lower limit $$\omega_k - \frac{\Delta\omega}{2}$$

and upper limit $$\omega_k + \frac{\Delta\omega}{2}$$

thus belongs to yaw rate value $\omega_k$. These intervals are referred to below as classes.

All values of the yaw rate measured by rotational rate sensor 21b are then assigned to the respective class. This yields the histogram illustrated in FIG. 5, which indicates classes on the x axis and the number of yaw rate values falling in each class on the y axis. Yaw rate offset value $\omega_{off3}$ may be determined from this histogram by various methods:

a) the average of the class having the highest count is sent as the yaw rate offset or b) the yaw rate offset is formed by forming a weighted average from the class having the highest count and n adjacent classes on the right and left sides. This is done through the equation $$\omega_{off3} = \frac{\sum_{i=k-n}^{i=k+n} z_i \omega_i}{\sum_{i=k-n}^{i=k+n} z_i}$$

where k is the index of the class having the highest count, $\omega_i$ is the yaw rate average of the class indicated by index i, and $z_i$ is the count of the class indicated by index i.

c) The yaw rate offset is formed by forming a weighted average over all classes. This may be accomplished by a linear inclusion of the counts with $$\omega_{off3} = \frac{\sum_{alle\ i} z_i \cdot \omega_i}{\sum_{alle\ i} z_i}$$

or through a quadratic inclusion of the counts with $$\omega_{off3} = \frac{\sum_{alle\ i} z_i^2 \cdot \omega_i}{\sum_{alle\ i} z_i^2}$$

The quadratic inclusion of the counts is suitable for suppressing secondary peaks occurring in the yaw rate in the histogram.

The error band may be narrower, for example, the more pronounced the peak in the histogram.

In the histogram method, it is possible to consider only yaw rate values up to a predetermined maximum absolute value for the consideration. In addition, offset values should be determined by the histogram method only if the longitudinal velocity of the vehicle exceeds a quantity to be predetermined. If these conditions are not met, then the last valid offset value determined by this method is used for the histogram method, so that the assigned error band becomes wider with an increase in the time interval. Since this histogram method is a statistical method, it requires a sufficiently large number of measured values.

Therefore, the histogram values of the last ignition cycle are input as initialization values when starting the vehicle.

The individual classes in the histogram may be filled up, for example, by simply adding up the number of yaw rate values to be assigned to the individual classes. In this example embodiment, however, the individual classes are not filled up by simply adding up the number of yaw rate values to be assigned to the individual classes but instead by low-pass filtering with an exponential characteristic. Values $z_i$ therefore always vary between 0 and filter input value $z_{FE}$ which may be, for example, $z_{FE}=1$, where $z_i=0$ denotes an empty class. If $z_i$ assumes filter input value $z_{FE}$, i.e., for example, $z_{FE}=1$, this means an infinite number of entries in this class. Count $z_i=Z_{FE}$ in a class, i.e., $z_{FE}=1$, for example, may thus never be reached, and only values close to the filter input value, e.g., 1, may be achieved. This prevents an overflow of classes when there are too many entries.

Figure 6:
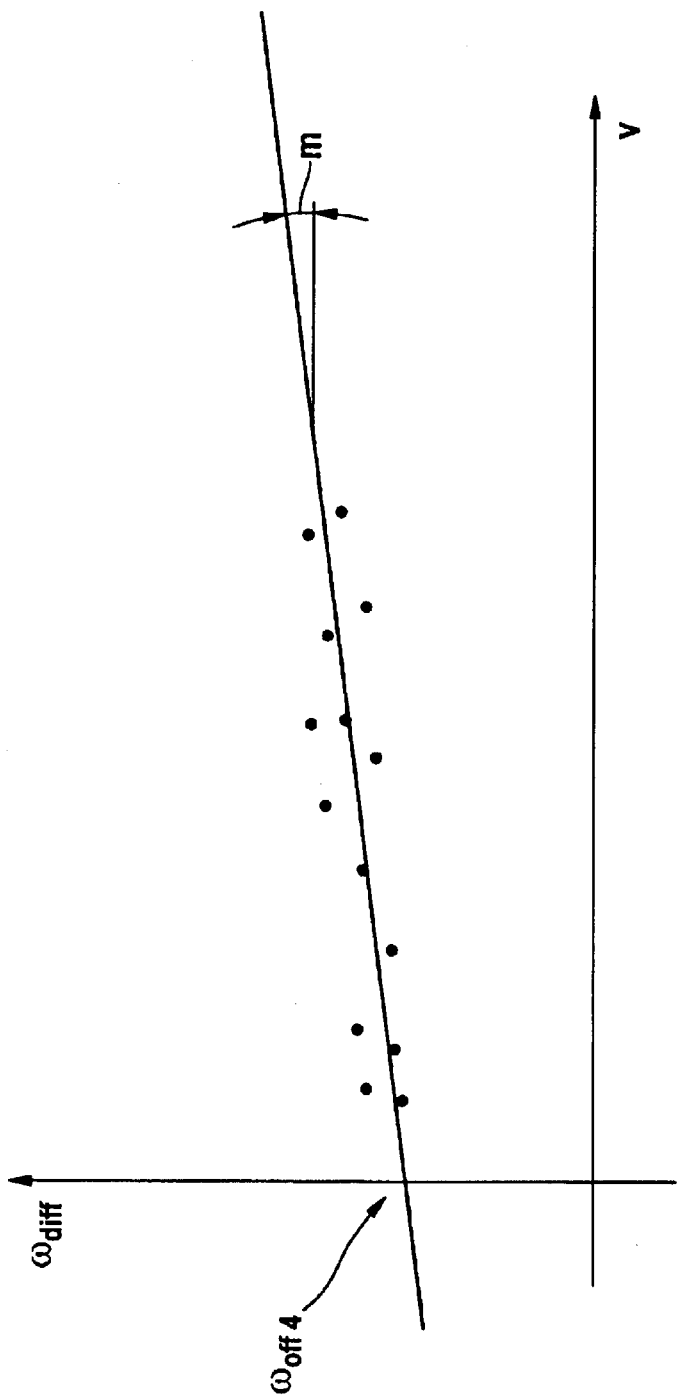
FIG. 6 illustrates in a qualitative representation an x-y diagram such as that used as the basis for the determination of the offset value by the regression method.

FIG. 6 illustrates qualitatively an xy diagram obtained by the regression method. The x axis illustrates longitudinal velocity v of the vehicle, and a quantity $\omega_{diff}$ is plotted on the y axis. This quantity $\omega_{diff}$ is obtained from $\omega_{diff}=\omega-\omega_{comp}$ where $\omega$ is the yaw rate measured by the rotational rate sensor and $\omega_{comp}$ is a yaw rate determined from the wheel rotational speeds as represented by the equation $$\omega_{comp} = \frac{\frac{v_r}{r+\Delta r_r} \cdot r - \frac{v_l}{r+\Delta r_l} \cdot r}{b}$$

where $v_l$ and $v_r$ are the actual wheel speeds on the left and right wheels, respectively, of the non-driven axle, r is the nominal value of the radius, $r+\Delta r_l$ is the actual radius of the left wheel of the non-driven axle, $r+\Delta r_r$ is the actual radius of the right wheel of the non-driven axle, and b is the wheel base.

This determination of $\omega_{comp}$ is based on the fact that different wheel rotational speeds occur on the inside wheels and the outside wheels when turning a corner.

It may be illustrated by analytical considerations that there is a linear relationship $\omega_{diff}=\omega_{off}+m \cdot v$ between $\omega_{diff}$ and v in first approximation, where $\omega_{off}$ denotes the y axis intercept and m denotes the slope, which also depends on wheel radii and wheel base. The following equation holds approximately for slope m $$m = \frac{1}{b} \cdot \left(\frac{\Delta r_r}{r} - \frac{\Delta r_l}{r}\right) \qquad (2)$$

At discrete points in time, a new point is plotted in the xy diagram by measuring v and determining $\omega_{diff}$. Then a regression line is drawn through these points. From this regression line, the y axis intercept and the slope m are determined. The y axis intercept represents yaw rate offset $\omega_{off4}$ and slope m provides information regarding differences in the wheel radii of the non-driven wheels by manner of equation (2). These differences may be due to tolerances in the tires. Determination of these differences may lead to savings in terms of a tire tolerance compensation.

If slope m has a value of zero, then the non-driven wheels have the same wheel radii.

Since the calculation of $\omega_{comp}$ is valid only for slip-free wheels, the wheels of the non-driven axle should be taken into account in the regression method.

The following three conditions are a prerequisite for the validity of the regression method:
1) The longitudinal velocity of the vehicle is greater than a predetermined limit velocity.
2) Yaw rate $\omega$ is smaller than a predetermined limit yaw rate.
3) Transverse acceleration $a_y$ of the vehicle is less than a predetermined limit transverse acceleration.

Point 1) ensures that the regression method is not used for a vehicle at a standstill. Points 2) and 3) ensure that the vehicle is not in a limit range in terms of driving dynamics.

The regression method requires a velocity variation. If this velocity variation is too low, i.e., the points in the xy diagram are displaced too far in the direction of the x axis, then the result becomes inaccurate.

The error band takes into account the variance and the average of the values of the longitudinal velocity of the vehicle, for example.

From offset values $\omega_{off1}, \ldots \omega_{off4}$ thus determined and the respective error bands having half-widths $\Delta\omega_{off1}, \ldots, \Delta\omega_{off4}$, a corrected offset value $\omega_{offcorr}$ is determined in block 24.

The corrected offset value may be determined in various manners. For example, as illustrated in FIG. 7, the corrected offset value may be determined as the average of the minimum of the maximum values and of the maximum of the minimum values. To do so, a minimum value $\omega_{offi}-\Delta\omega_{offi}$ and a maximum value $\omega_{offi}+\Delta\omega_{offi}$ are calculated from offset value $\omega_{offi}$ determined by the i-th method and from the respective error band having half-width $\Delta\omega_{\textit{offi}}$. Then the minimum and maximum values of all four methods are plotted on the ω axis. Of the four minimum values plotted, the largest minimum value (labeled as max ($\omega_{\textit{offi}}-\Delta\omega_{\textit{offi}}$) in FIG. 7) is determined. For the four maximum values plotted, the smallest maximum value (labeled as min ($\omega_{\textit{offi}}+\Delta\omega_{\textit{offi}}$) in FIG. 7) is determined. For the case when the largest minimum value is smaller than the smallest maximum value, there is a common intersection of all four methods with the largest minimum value as the lower limit and with the smallest maximum value as the upper limit.

By forming an average between the minimum of all maximum values and the maximum of all minimum values, the midpoint of the intersection is determined and used as corrected offset value $\omega_{\textit{offcorr}}$. This method may also be used for the case when there is no common intersection, i.e., the largest minimum value is greater than the smallest maximum value.

As an alternative, it is also possible to obtain the corrected offset value by weighted averaging from all four offset values thus determined. In weighted averaging, the offset value whose error band width is smallest may have the greatest weight. This may be accomplished, for example, by performing the following weighted averaging:

$$\omega_{\textit{offkor}} = \frac{\sum_{i=1}^{4}\left(\frac{\omega_{\textit{off }i}}{\Delta\omega_{\textit{off }i}}\right)}{\sum_{i=1}^{4}\left(\frac{1}{\Delta\omega_{\textit{off }i}}\right)}$$

The determination of the corrected offset value of the rotational rate sensor should be repeated at regular or irregular time intervals. In practice, time intervals may be on the order of 0.1 second to 1 second.

What is claimed is:

1. A device for determining a corrected offset value which represents an offset of an output signal of a first vehicle sensor, the first vehicle sensor configured to determine at least one motion of a vehicle, comprising:
    a first arrangement configured to determine at least two offset values representing the offset of the first vehicle sensor by at least two different methods, and for at least one of the offset values of the first vehicle sensor thus determined, to determine an error band in addition to the offset value; and
    a second arrangement configured to determine the corrected offset value as a function of the offset values thus determined and at least one of the error bands.

2. The device according to claim 1, wherein the error bands correspond to a minimum value and a maximum value for each offset value.

3. The device according to claim 2, wherein the second arrangement is configured to determine the corrected offset value of the first vehicle sensor by forming an average between a minimum of all maximum values and a maximum of all minimum values for the minimum and maximum values of the offset values of the first vehicle sensor obtained by at least two different methods.

4. The device according to claim 1, wherein the second arrangement is configured to determine the corrected offset value of the vehicle sensor by forming a weighted average between the offset values of the first vehicle sensor thus determined, the offset value having a lower weight in forming the average with an increase in a width of the error band.

5. The device according to claim 1, wherein at least one error band becomes wider, the longer it has been since the last determination of the respective offset value.

6. The device according to claim 1, wherein each of the different methods of determining offset values has a validity range assigned to it which depends on a driving status;
    wherein, for those methods which are outside their validity range at a moment due to a prevailing driving status and which do not determine a quantity representing the offset value, the quantity representing the offset value determined most recently by this method within the last occurrence of this validity range is used; and
    wherein the respective error band becomes wider, the longer it has been since this last valid determination of this quantity representing the offset value.

7. The device according to claim 1, wherein the first vehicle sensor is configured to detect a yawing motion of the vehicle.

8. The device according to claim 7, wherein the second arrangement is configured to determine the corrected offset value in accordance with at least one of automatic distance regulation and control adaption cruise control in the vehicle.

9. The device according to claim 1, wherein the first arrangement is configured to determine the offset values as a function of output signals of at least one additional sensor configured to detect motion of the vehicle, and the first vehicle sensor, the output signals representing at least one of wheel rotational speeds of at least one vehicle wheel, a steering wheel angle of the vehicle, and a yaw rate of the vehicle.

10. The device according to claim 1, wherein the first arrangement is configured to determine the offset value by at least one method as a function of an operating state of the vehicle prevailing at a moment, the operating state prevailing at the moment determined in accordance with at least one of a longitudinal velocity of the vehicle, a yaw rate, and a steering wheel angle.

11. The device according to claim 9, wherein the first arrangement is configured to determine the offset value by at least one method as at least one of a function of at least an analysis of one output signal of at least one of the additional sensors at at least two different points in time and a function of at least an analysis of one output signal of the first vehicle sensor at at least two different points in time; and
    wherein the first arrangement is configured to determine at least one offset value at least one of as a function of a time characteristic of the output signal of the first vehicle sensor and as a function of signals that represent the wheel rotational speeds of at least one vehicle wheel.

12. The device according to claim 1, wherein the first arrangement is configured to determination, by a first method, a first offset value by a standstill compensation method, in accordance with a negligible longitudinal velocity of the vehicle, a negligible yaw rate, and a negligible time derivation of the yaw rate;
    wherein the first arrangement is configured to determine, by a second method, a second offset value by a steering angle method, in accordance with a longitudinal velocity of the vehicle and a steering wheel angle;
    wherein the first arrangement is configured to determine, by a third method, a third offset value by a histogram method; and
    wherein the first arrangement is configured to determine, by a fourth method, a fourth offset value by a regression method, the yaw rate calculated from differences in wheel rotational speed.

13. The device according to claim 1, wherein the second arrangement is configured to determine the corrected offset value at one of regular and irregular time intervals.

14. A method of determining a corrected offset value which represents an offset of an output signal of a first vehicle sensor, the sensor configured to determine at least one motion of a vehicle, comprising the steps of:

determining at least two offset values representing the offset of the first vehicle sensor by at least two different methods;

determining an error band in addition to the offset value for the offset values of the first vehicle sensor determined by at least one of the methods; and determining the corrected offset value as a function of the offset values determined and at least one of the error bands.

15. The method according to claim 14, wherein the vehicle sensor is configured to detect a yawing motion of the vehicle.

* * * * *

UNITED STATES PATENT AND TRADEMARK OFFICE
CERTIFICATE OF CORRECTION

PATENT NO. : 6,704,631 B2
DATED : March 9, 2004
INVENTOR(S) : Hermann Winner et al.

It is certified that error appears in the above-identified patent and that said Letters Patent is hereby corrected as shown below:

Column 3,
Line 19, change "as a-function" to -- as a function --

Column 10,
Line 39, change "$\omega_{k-1} \quad \omega_{k}-\Delta\omega$" to -- $\omega_{k-1} = \omega_{k}-\Delta\omega$ --.

Signed and Sealed this

Fifth Day of April, 2005

JON W. DUDAS
*Director of the United States Patent and Trademark Office*